(12) United States Patent
Gurunathan et al.

(10) Patent No.: US 8,289,730 B2
(45) Date of Patent: Oct. 16, 2012

(54) RIPPLE CANCELLATION

(75) Inventors: Ranganathan Gurunathan, Chennai (IN); Ramesh Srinivasan, Chennai (IN); Pavana Kumar, Chennai (IN)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 13/154,888

(22) Filed: Jun. 7, 2011

(65) Prior Publication Data

US 2011/0278935 A1    Nov. 17, 2011

Related U.S. Application Data

(62) Division of application No. 11/797,707, filed on May 7, 2007, now Pat. No. 7,974,106.

(51) Int. Cl.
| | |
|---|---|
| H02M 3/335 | (2006.01) |
| H02M 1/12 | (2006.01) |
| H02M 7/48 | (2007.01) |
| H02M 7/08 | (2006.01) |
| H02M 7/04 | (2006.01) |
| H02M 7/5387 | (2007.01) |
| H02J 1/10 | (2006.01) |

(52) U.S. Cl. ........... 363/17; 363/65; 363/71; 363/21.03; 363/46; 363/69; 363/70; 363/21.02; 363/45; 363/67; 363/98; 363/132

(58) Field of Classification Search ............... 363/17, 363/65, 71, 21.03, 46, 69, 70, 21.02, 45, 363/67, 98, 132
See application file for complete search history.

(56) References Cited

U.S. PATENT DOCUMENTS

| | | | |
|---|---|---|---|
| 4,409,537 A | 10/1983 | Harris | |
| 5,932,995 A | 8/1999 | Wagoner | |
| 6,497,974 B2 | 12/2002 | Fuglevand | |
| 6,608,404 B2 | 8/2003 | Schienbein et al. | |
| 7,030,512 B2 * | 4/2006 | Krein | 307/77 |
| 2006/0152085 A1 * | 7/2006 | Flett et al. | 307/75 |
| 2007/0196704 A1 | 8/2007 | Valensa | |
| 2007/0262648 A1 | 11/2007 | McKenzie | |

FOREIGN PATENT DOCUMENTS

| | | |
|---|---|---|
| JP | 2003-134691 A | 5/2003 |
| JP | 2004-056989 A | 2/2004 |
| KR | 10-2004-78832 A | 9/2004 |

OTHER PUBLICATIONS

U.S. Appl. No. 11/797,708, filed May 7, 2007, Ramesh Srinivasan et al.
U.S. Appl. No. 11/656,006, filed Jan. 22, 2007, K.R. Sridhar.
Matsuo et al., "Characteristics of the Multiple-Input DC-DC Converter," IEEE Transactions on Industrial Electronics, Jun. 2004, 51(3):625-631.
Ozpineci et al., "Integrating Multiple Solid Oxide Fuel Cell Modules," 2003 IEEE IECON Conference, Nov. 2-6, 2003, 2:1568-1573.
Ozpineci et al., "Multiple Input Converters for Fuel Cells," 2004 IEEE IAS Conference, Oct. 3-7, 2004, 2:791-797.

* cited by examiner

*Primary Examiner* — Helen O Conley
(74) *Attorney, Agent, or Firm* — The Marbury Law Group, PLLC

(57) ABSTRACT

Systems, methods and devices for power generation systems are described. In particular, embodiments of the invention relate to the architecture of power conditioning systems for use with fuel cells and methods used therein. More particularly, embodiments of the present invention relate to methods and systems usable to reduce ripple currents in fuel cells.

9 Claims, 5 Drawing Sheets

US 8,289,730 B2

RIPPLE CANCELLATION

BACKGROUND OF THE INVENTION

The present invention relates generally to the field of power conversion systems. More particularly, embodiments of the present invention employ various architectures of power conversion systems and various methods to convert power. Still more particularly, embodiments of the present invention relate to power conversion systems for power generated by fuel cells.

Fuel cell systems are currently being used in a variety of power supply applications. If an application requires a particular voltage or current, fuel cells are combined into units called "stacks" in which the fuel cells are electrically connected in series to meet the requirements. A generalization of a fuel cell stack is the so-called fuel cell segment or column, which can contain one or more fuel cell stacks. In certain applications, many fuel cell segments may be required for higher power due to the limitation of current carrying capability of the fuel cells. For reliable operation, individual stack current can be controlled, to improve fuel utilization.

Fuel cells generate power that is converted in a fuel cell power conversion system, also known as a power conditioning system. A power conversion system is a system that alters the characteristics of power produced by a source in some way. For the case of fuel cells, which generate DC (direct current) power, this can mean the conversion of the DC power to different voltage and/or current levels, the conversion to AC (alternating current) power with a particular RMS (root mean squared) voltage, the generation of three-phase AC power, or all of the above. Typically, a change in the voltage level of a DC source can be accomplished using a DC/DC (direct current/direct current) converter, whereas the change from DC to AC is accomplished using a DC/AC (direct current/alternating current) converter or inverter.

The expected increase in fuel cell use in the future, in terms of both volume and number of applications, requires that the design and construction of fuel cell power systems be made as efficient as possible. To facilitate the design and manufacturing of fuel cell power control systems, it is advantageous to allow design flexibility while minimizing the number of components required to produce such an architecture.

In particular, it is of interest in power generation systems using fuel cells to reduce the effect of ripple currents through the fuel cells. Ripple currents are AC (alternating current) components of the total current function of the fuel cell. Ripple currents can be produce by a variety of components in a fuel cell system. Ripple currents can cause inefficient power generation by fuel cells and can damage a fuel cell. Thus, there is a need to reduce the effect of ripple currents in fuel cell systems.

SUMMARY OF THE INVENTION

As discussed hereinafter, one embodiment of the invention employs a power conversion system that is constructed with a two-bus approach and center-tapped neutral line. Such an embodiment is used to facilitate a modular approach and control of power drawn from the fuel cell stack by the power conversion system. Furthermore, it is advantageous in some embodiments to have a fuel cell power conversion system where the number of individually wired stack columns in a fuel cell hot box is evenly divisible by 3 and 2 (meaning evenly divisible by 6) in order to achieve an optimum power electronics architecture.

One exemplary embodiment relates to a fuel cell circuit, comprising: a first fuel cell segment having positive and negative terminals; a second fuel cell segment having positive and negative terminals; a neutral line; and wherein the negative terminal of the first fuel cell segment is electrically connected to both the positive terminal of the second fuel cell segment and the neutral line.

Another embodiment relates to a power conversion module, comprising: a plurality of DC/DC converter branches, each branch comprising a DC/DC converter; and a plurality of series connections comprising two fuel cell segments; wherein each DC/DC converter branch is connected to at most one of the series connections comprising two fuel cell segments; and wherein the total number of DC/DC converter branches is an integer multiple of three.

Yet another embodiment relates to a method for converting DC to AC, comprising accepting a first output of a first series connection comprising two fuel cell segments at an input of a first DC/DC converter; accepting a second output of a first series connection comprising two fuel cell segments at an input of a second DC/DC converter; accepting a first output of the first DC/DC converter at a first input of a first inverter; accepting a first output of the second DC/DC converter at a second input of the first inverter; and generating a first AC output from the first and second inputs of the first inverter relative to a neutral line connected to a reference potential.

Yet another embodiment relates to a method for reducing a ripple current in a fuel cell system, comprising supplying the positive output of a fuel cell segment to a first DC/DC converter; supplying the negative output of the fuel cell segment to a second DC/DC converter; wherein an output of the first DC/DC converter and an output of the second DC/DC converter are electrically connected; supplying the positive output of the fuel cell segment to a third DC/DC converter; supplying the negative output of the fuel cell segment to a fourth DC/DC converter; and wherein an output of the third DC/DC converter and an output of the fourth DC/DC converter are electrically connected.

Still another embodiment relates to an architecture for a fuel cell power conditioning system, comprising: a fuel cell segment arranged to have a positive terminal and a negative terminal; a first DC/DC converter, an input of which is connected to the positive terminal of the fuel cell segment; a second DC/DC converter, an input of which is connected to the negative terminal of the fuel cell segment; wherein an output of the first DC/DC converter is electrically connected with an output of the second DC/DC converter; and further comprising a third DC/DC converter, an input of which is connected to the positive terminal of the fuel cell segment; a fourth DC/DC converter, an input of which is connected to the negative terminal of the fuel cell segment; wherein an output of the third DC/DC converter is electrically connected with an output of the fourth DC/DC converter; further comprising a DC/AC converter comprising a first input electrically connected to the output of the first DC/DC converter and a second input electrically connected to the output of the third DC/DC converter; wherein the DC/AC converter produces a three-phase current output from the first and second inputs.

Another embodiment of the invention relates to a power generation system, comprising first, second and third DC/AC converters; first through ninth DC/DC Converters; and first through third fuel cell segments; wherein an input to the first DC/AC converter is electrically connected to an output of the first DC/DC converter, an output of the second DC/DC converter and an output of the third DC/DC converter; wherein the first fuel cell segment comprises positive terminal, a negative terminal and a middle node, and an input to the first DC/DC converter is connected to the positive terminal of the first fuel cell segment; wherein the second fuel cell segment comprises positive terminal, a negative terminal and a middle node, and an input to the second DC/DC converter is electrically connected to the middle node of the second fuel cell segment; wherein the third fuel cell segment comprises positive terminal, a negative terminal and a middle node, and an input to the third DC/DC converter is electrically connected to the positive terminal of the third fuel cell segment; wherein an input to the second DC/AC converter is electrically connected to an output of the fourth DC/DC converter, an output of the fifth DC/DC converter and an output of the sixth DC/DC converter; wherein an input to the third DC/AC converter is electrically connected to an output of the seventh DC/DC converter, an output of the eighth DC/DC converter and an output of the ninth DC/DC converter; wherein an input to the fourth DC/DC converter is electrically connected to the middle node of the first fuel cell segment; wherein an input to the fifth DC/DC converter is electrically connected to the positive terminal of the second fuel cell segment; wherein an input to the sixth DC/DC converter is electrically connected to the positive terminal of the third fuel cell segment; wherein an input to the seventh DC/DC converter is electrically connected to the middle node of the first fuel cell segment; wherein an input to the eighth DC/DC converter is electrically connected to the middle node of the second fuel cell segment; and wherein an input to the ninth DC/DC converter is electrically connected to the positive terminal of the third fuel cell segment.

Yet another embodiment of the invention relates to a system comprising at least one DC/DC converter and at least one fuel cell, wherein the system is configured to operate such that the fuel cell ripple current has an RMS amplitude of less than 5% of the DC fuel cell current.

A further embodiment of the invention relates to a system comprising at least one DC/DC converter and at least one fuel cell, wherein the system is configured to operate such that the fuel cell ripple current has an RMS amplitude of less than 1% of the DC fuel cell current.

Another embodiment of the invention relates to a system comprising at least one DC/DC converter and at least one fuel cell, wherein the system is configured to operate such that the fuel cell ripple current has produced by the DC/DC converter is not observable.

DETAILED DESCRIPTION OF THE PREFERRED EMBODIMENTS

Figure 1:
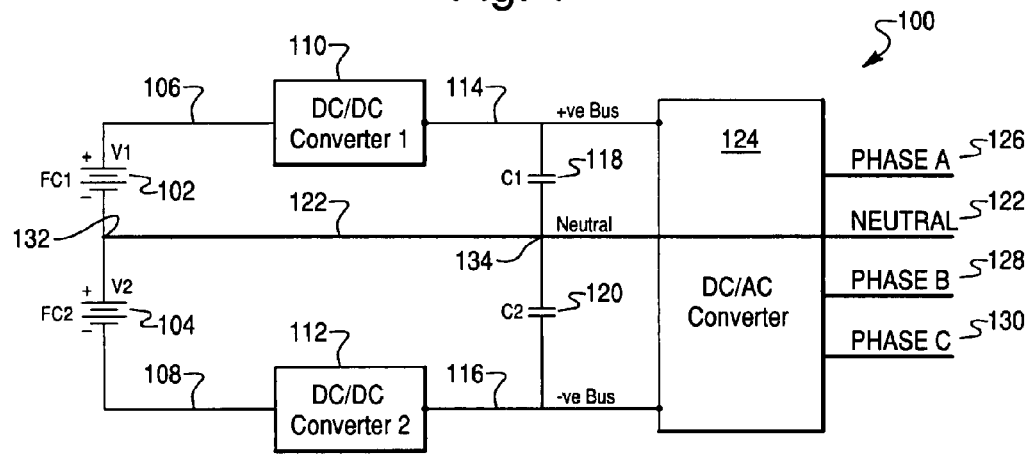
FIG. 1 is a block cell circuit diagram illustrating a fuel cell power conversion system architecture embodiment.

Referring to FIG. 1, a fuel cell power conversion system architecture embodiment 100 with two parallel busses is shown. The architecture 100 is illustrated from fuel cells to three-phase power output, and may be referred to as a type of power conversion module, where "module" is a general term referring to a group of system components. The system 100 comprises two fuel cell segments 102 and 104 containing one or more fuel cells and having respective connections 106 and 108 to DC/DC converters 110 and 112. DC/DC converters 110 and 112 are similar converters. They are usually boost converters. DC/DC converters 110 and 112 have respective output busses 114 and 116, referred to hereinafter as the +ve and −ve busses, respectively. Each circuit branch having a DC/DC converter and extending, for example, from connection 106 through DC/DC converter 110 and ending with bus 114 may be referred to as a DC/DC converter branch. If the fuel cell segments are included, the terminology "stack column" or "segment column" may be used.

The fuel cell segments 102 and 104 are connected in series at node 132, which is also connected to neutral line 122. Node 132 highlights that possibility that fuel cells, stacks and segments of the herein described embodiments can be individually wired, which allows a system designer to advantageously connected mid-cell, mid-stack and mid-segment potentials to a system bus. Here, "individually wired" means that the fuel cell or stack end plates which normally comprise the terminals of a fuel cell or stack are not electrically connected by face to face contact with other end plates, but are rather electrically connected by a conductor, such as a wire.

The output of DC/DC converter 110 is connected to +ve bus 114, which is connected over a voltage drop of +ve by capacitor 118 to node 134, which is connected to and at the same potential as neutral line 122. The output of DC/DC converter 112 is similarly connected to −ve bus 116, which is connected over a voltage drop of −ve by capacitor 120 to node 134. Capacitors 118 and 120 also serve to smooth AC components of the signals carried by +ve bus 114 and −ve bus 116, known as "ripple currents".

The +ve bus 114 and −ve bus 116 serve as inputs to DC/AC converter or inverter 124, which generates three-phase outputs 126, 128 and 130. The three-phase outputs have a desired RMS (root mean-squared) potential over neutral line 122 and 120 degree phase offsets relative to one another. In the embodiment 100, all three phases are generated by DC/AC converter or inverter 124, although this is not strictly necessary. Neutral 122 is already efficiently provided by the dual bus architecture.

The split fuel cell connection as shown with fuel cell segments 102 and 104 provides high efficiency for a power conversion system with its dual bus architecture. The split bus provides a neutral and facilitates easy paralleling of converters. The efficiency of the architecture derives from the fact that two fuel cell segments 102 and 104 are used, which facilitates the construction of counterpoised +ve and −ve busses 114 and 116 respectively and the easy generation of a neutral line 122 between the two. It will be apparent that the dual bus architecture may be multiplied and extended to systems involving integral multiples of fuel cell stack systems arranged according to the configuration of FIG. 1.

Figure 2:
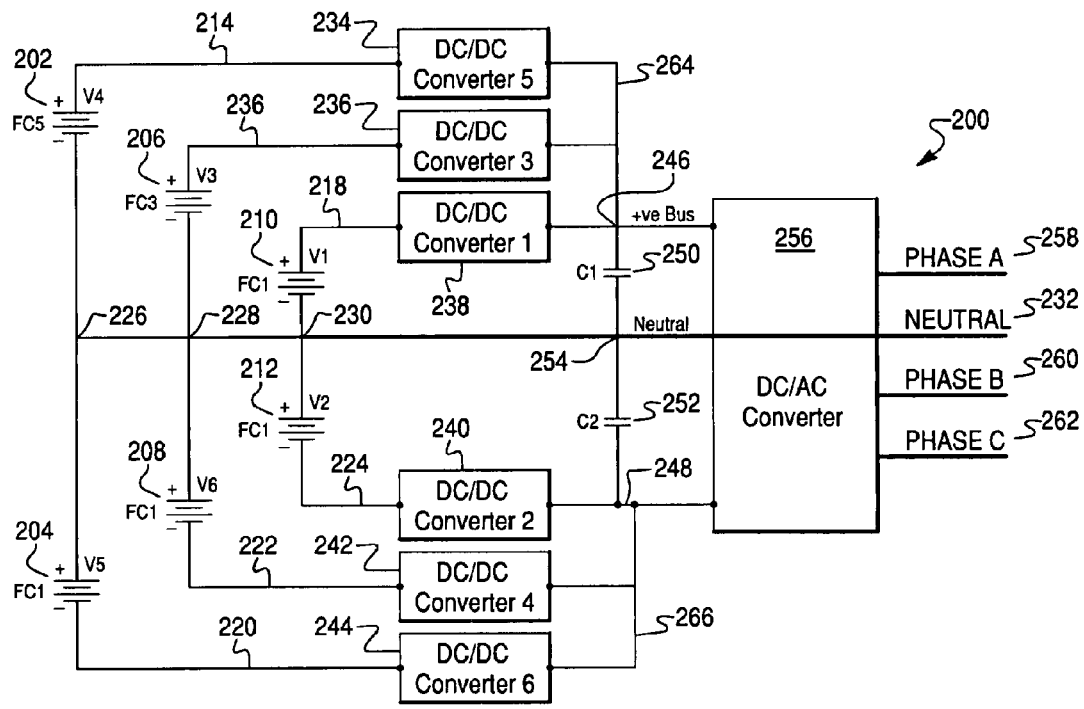
FIG. 2 is a block cell circuit diagram illustrating a second fuel cell power conversion system architecture embodiment.

Referring now to FIG. 2, a second embodiment in the form of a fuel cell power conversion system architecture 200 is shown. The architecture 200 may also be referred to as a power conversion module. The embodiment of FIG. 2 comprises three pairs of fuel cell segments. Fuel cell segments 202 and 204 are paired in an arrangement similar to that described with reference to FIG. 1. Fuel cell segments 206 and 208, as well as fuel cell segments 210 and 212 are also similarly paired. As an example, fuel cell segment 202 is connected with its negative terminal to node 226, while fuel cell segment 204 is connected with its positive terminal to node 226. Fuel cell segments 206 and 210 are also connected with their negative terminals to nodes 228 and 230 respectively. Nodes 228 and 230 are connected to nodes 226 and 254 as well as neutral line 232, and are at the same electrical potential. Fuel cell segments 208 and 212 are connected with their positive terminals to nodes 228 and 230 respectively.

Each fuel cell segment 202, 206 and 210 has an output bus 214, 216 or 218 respectively. The output busses feed fuel cell segment output to a DC/DC converter 234, 236 or 238, respectively. The DC/DC converters 234, 236 or 238 are generally boost converters and serve to bring the +ve output bus 264 to a voltage level with respect to neutral line 232 appropriate for the power system application. The negative terminals of fuel cell segments 204, 208 and 212 are also connected to output busses 220, 222 and 224 respectively, leading to DC/DC converters 244, 242 and 240 respectively. These DC/DC converters serve the same function as DC/DC converters 234, 236 and 238, albeit with an opposite polarity, bringing the voltage on −ve bus 266 to a suitably negative level with respect to neutral line 232.

The +ve bus 264 is joined at node 246, placing the DC/DC converters in a parallel circuit architecture. A voltage drop occurs at capacitor 250 to neutral line 232 at node 254. Capacitor 252 also serves to smooth out ripple currents produced by DC/DC converters 234, 236 and 238. Similarly, −ve bus 266 is joined at node 248, placing DC/DC converters 240, 242 and 244 in a parallel circuit architecture. A voltage increase occurs from node 248 over capacitor 252 to neutral line 232 at node 254. Capacitor 252 also serves to smooth out ripple currents from DC/DC converters 240, 242 and 244.

The +ve bus 264 and −ve bus 266 are connected as inputs to AC/DC converter or inverter 256. AC/DC converter or inverter 256 takes the two inputs with a DC voltage difference of +2ve and creates a three phase output made up of phase A 258, phase B 260 and phase C 262. Each of the three phases is an AC signal with a 120 degree phase offset to each other phase and an RMS voltage with respect to neutral line 232 that is appropriate for the power system application.

Figure 3:
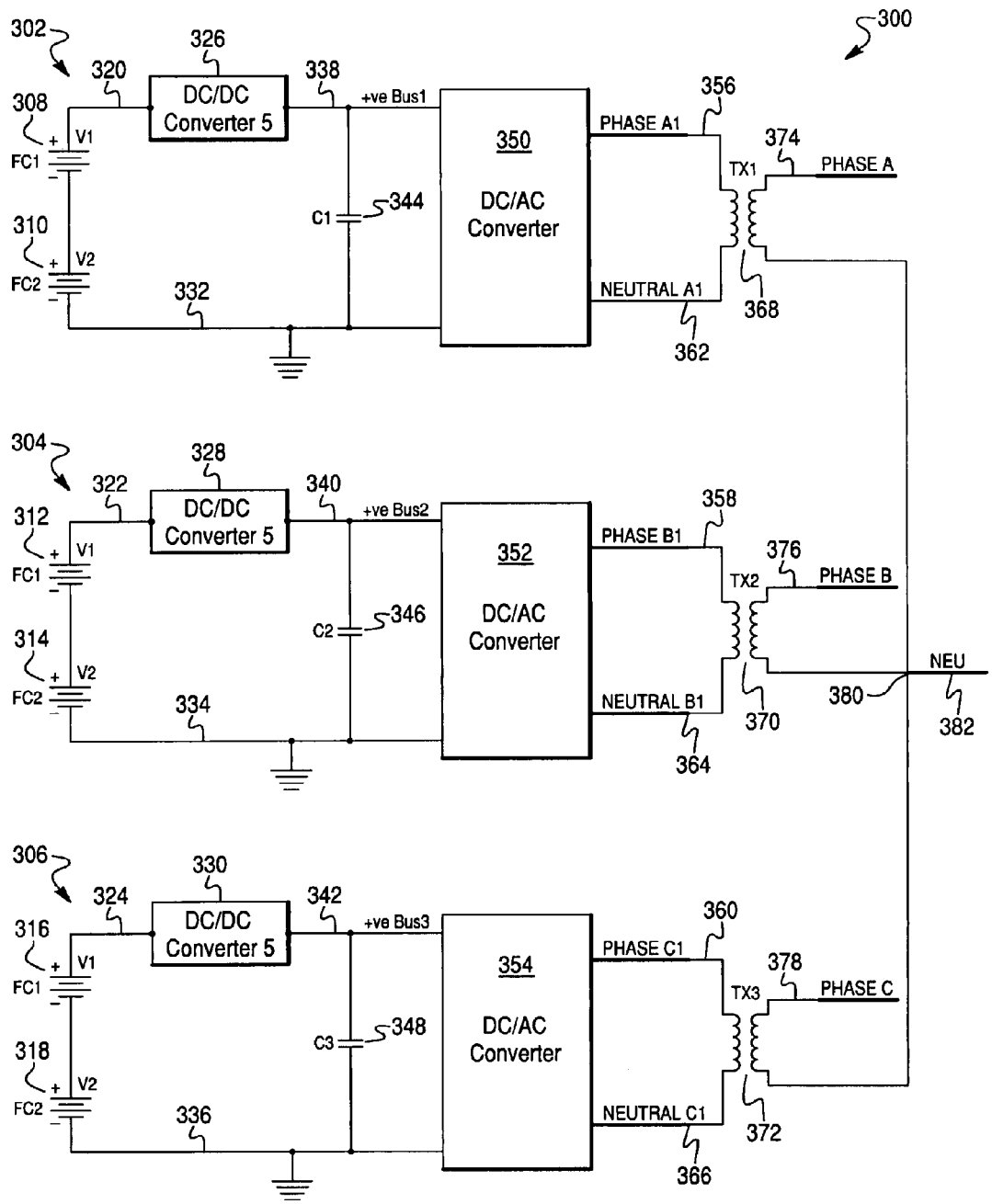
FIG. 3 is a block cell circuit diagram illustrating a third fuel cell power conversion system architecture embodiment.

The fuel cell power conversion system architecture 200 presents advantages in terms of modular design of the fuel system architecture. The architecture has adopted the dual bus architecture of the system of FIG. 1, with a neutral line derived from the middle node of the two fuel cell segment components. This architecture is multiplied by three in parallel for the embodiment of FIG. 2. That is, there are six parallel branches for DC/DC conversion, each containing a fuel cell segment pair in series with a neutral derived from the middle point of the pair. Thus, the fuel cell power conversion system of the embodiment of FIG. 2 are designed using integral multiples of six fuel cell segments per AC/DC converter or inverter. An integral multiple of 3 fuel cell segment pairs will make the power distribution along each phase easier and with minimum number of DC/DC converters. FIG. 3 shows a fuel cell power conversion system architecture 300 with output transformers for a four-wire (with neutral) system. The architecture shows a fuel cell power conversion system implementation with a single DC bus approach.

The system 300 comprises three parallel circuit branches 302, 304 and 306, each having a fuel cell segment pair 308 and 310, 312 and 314, or 316 and 318, respectively. Each fuel cell segment pair is connected in series so that their respective voltage increases are summed.

The outputs of fuel cell segments 308, 312 and 316 are connected to busses 320, 322 and 324 respectively, which lead to the inputs of DC/DC converters 326, 328 and 330, respectively. The negative terminal of the series connected fuel cell segments 308, 312 and 316 are connected to reference busses 332, 334 and 336 respectively, which are each connected to a reference potential such as ground. It is clear that a reference potential can be any relatively steady or convenient potential relative to non-reference lines.

The outputs of each DC/DC converter 326, 328 and 330 are each connected to +ve busses 338, 340 and 342 respectively. The +ve busses 338, 340 or 342 are connected to a capacitors 344, 346 and 348, respectively, which are in turn connected to reference busses 332, 334 and 336 respectively, to produce a voltage drop of +ve over each capacitor. The capacitors 344, 346 and 348 also serve to smooth ripple currents produced by DC/DC converters 326, 328 and 330 respectively.

The +ve busses 338, 340 and 342 and reference busses 332, 334 and 336 serve as inputs to DC/AC converters or inverters 350, 352 and 354 respectively. In contrast to the embodiments of FIGS. 1 and 2, each phase of the three-phase current output has its own DC/AC converter or inverter. The output of each DC/AC converter 350, 352 and 354 produces a respective phase signal 356, 358 or 360 respectively and a neutral line 362, 364 or 366 respectively. The use of three separate input branches for DC/AC inverter is particularly advantageous for the development of three-phase AC current, as each phase has its own neutral, positive and negative busses, that is, each of the three phases runs from its own DC bus.

The three phase outputs 356, 358 or 360 are transformed to an application RMS voltage by transformers 368, 370 and 372 respectively. The neutral line outputs from the transformers are connected at node 382 to generate a single neutral line.

The Figures also show in exemplary fashion methods that may be used for power generation and conditioning. For example, FIG. 1 demonstrates a method that may be used generally to convert the output of a direct current source to alternating current. As a first step, a first output 106 of a first series connection of two fuel cell segments (segments 102 and 104) is accepted at an input of a first DC/DC converter 110. A second output 108 of a first series connection of two fuel cell segments (segments 102 and 104) is accepted at an input of a second DC/DC converter 112. A first output 114 of the first DC/DC converter 110 is accepted at a first input 114 of a first inverter (i.e., DC/AC converter) 124. A first output 116 of the second DC/DC converter 112 is accepted at a second input 116 of the first inverter 124. A first AC output 126 is generated from the first and second inputs 114 and 116 of the first inverter 124 relative to a neutral line 122 connected to a reference potential.

Such a method may be expanded as shown in FIG. 2, wherein three fuel cell segment pairs are shown (including segments 202 and 204; 206 and 208; and 210 and 212 respectively), the outputs of each of which are accepted at the inputs of two DC/DC converters (234 and 244; 236 and 242 and 238 and 240 respectively) per fuel cell segment pair. The outputs of the DC/DC converters are electrically connected. The outputs of upper DC/DC converters 234, 236 and 238 are accepted at a first input of inverter 256, while the outputs of lower DC/DC converters 240, 242 and 244 are accepted at a second input of inverter 256. From these inputs, inverter 256 generates three phase outputs 258, 260 and 262 relative to neutral line 232.

Such a method may be also be expanded as shown in FIG. 3 to encompass multiple fuel cell stack segment pairs with corresponding DC/DC converters using a single inverter. Additionally, such methods may be used in the system of FIG. 3, wherein the first outputs 320, 322 and 324 respectively of multiple fuel cell stack segments (fuel cells 308 and 310; 312 and 314; and 316 and 318 respectively) are accepted at the inputs of DC/DC converters 326, 328 and 330 respectively.

The outputs of the DC/DC converters and the second outputs of the fuel cell stack segments are in turn accepted at respective inverters (DC/AC converters) 350, 352 and 354. The inverters 350, 352 and 354 produce three phases 356, 358 and 360.

Figure 4:
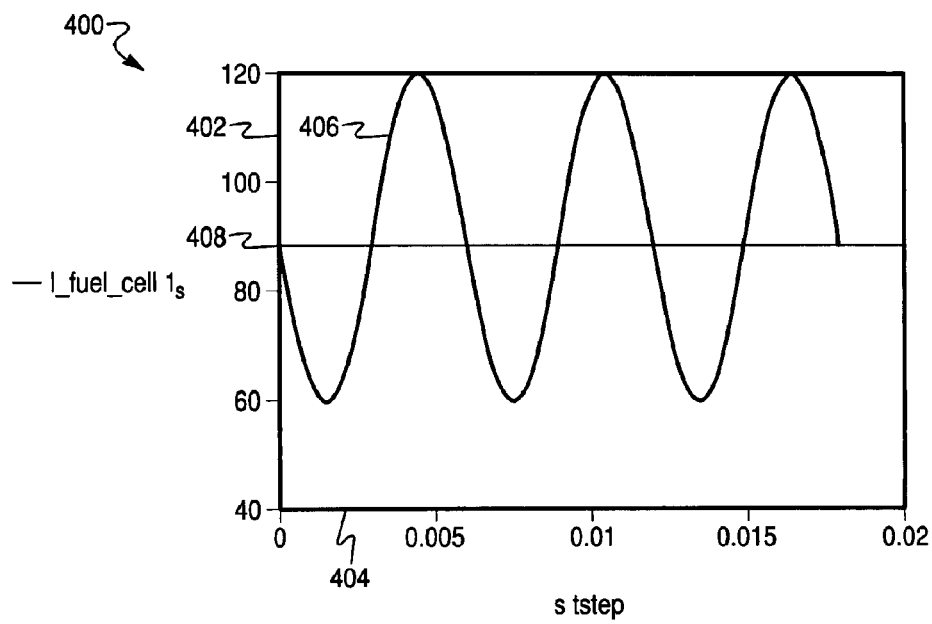
FIG. 4 shows instantaneous fuel cell current as a function of time.

Another embodiment of the invention is explained in reference to FIG. 4. DC/DC converters, although their purpose is to change the voltage with respect to ground of DC power sources, can add non-DC components to the DC source. In addition, inverters such as the inverter 124 shown in FIG. 1 can add their own higher-frequency components to AC output. Such non-DC components are known in the art as "ripple currents". Ripple currents are detrimental both to the fuel cell stack, where they increase the RMS current draw of a fuel cell stack and lower fuel cell efficiency, as well as to the ultimate application, where the presence of ripple currents can decrease the efficiency of power usage. The ripple current through the fuel cell stack should be reduced as much as possible, as it decreases the fuel utilization and can starve the fuel cells for want of fuel.

FIG. 4 shows a simulated example of ripple currents as they would be produced through an exemplary system as shown in FIG. 1. FIG. 4 is a graph 400 that shows fuel cell current as a function of time. Graph 400 has a Y-axis 402 which represents fuel cell current in dimensionless units, an X-axis 404 which represents the passage of time in seconds, and a current versus time function 406. The current versus time function 406 has an oscillating component and a constant (DC) component as indicated by 408, around which the oscillating component oscillates. The oscillating component can be referred to as the ripple current. As seen from FIG. 4, the amplitude ripple current oscillation is approximately 30% of the value of the constant component.

Figure 5:
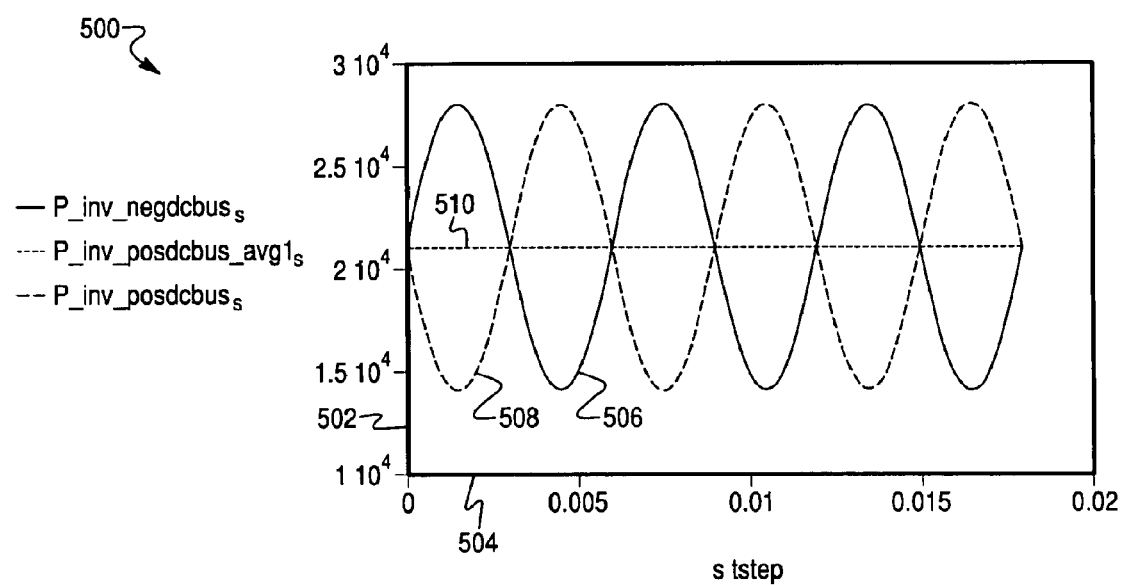
FIG. 5 shows is a simulated graph of instantaneous power on the +ve and −ve busses.

Again with respect to the architecture shown in FIG. 1, FIG. 5 shows the simulated instantaneous power carried by the positive and negative DC busses 114 and 116 of FIG. 1. FIG. 5 is a graph 500, which in turn has a Y-axis 502 representing instantaneous power in dimensionless units and an X-axis 504 representing the passage of time in seconds. The graph 500 in FIG. 5 also has a negative DC Bus power function 506, a positive DC bus power function 508, and an average power function 510, which represents the average of the instantaneous power functions 506 and 508. It can be seen that the power functions 506 and 508 are approximately harmonic functions that are 180 degrees out of phase for 3-phase balanced power, resulting in an average function 510 that is approximately zero.

Figure 6:
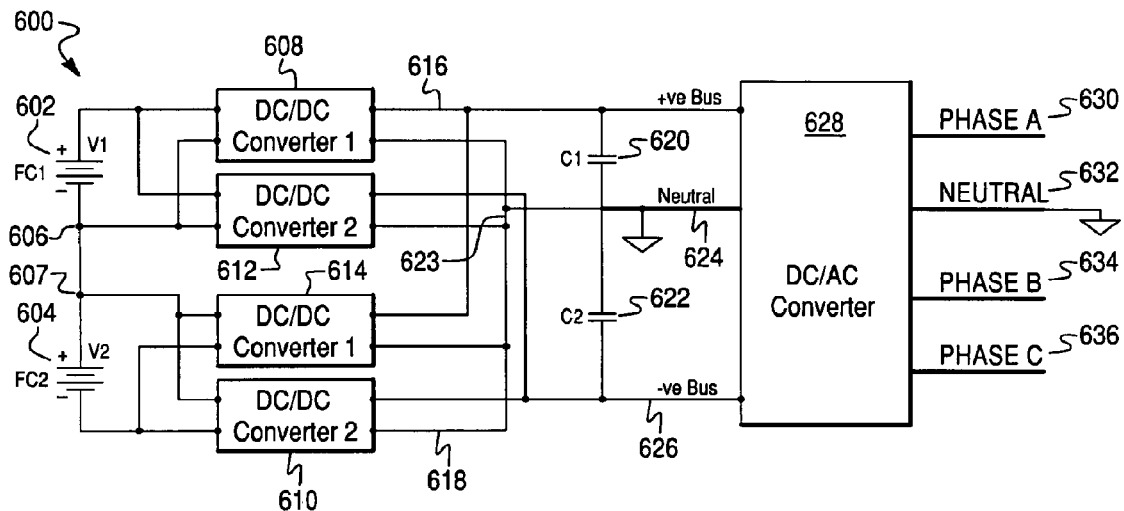
FIG. 6 illustrates a proposed system architecture for part of a fuel cell power conditioning system.

FIG. 6 illustrates a partial power conditioning system architecture 600 that reduces ripple currents. FIG. 6 has a fuel cell or fuel cell stacks 602 and 604, connected in series over nodes 606 and 607. As mentioned previously, the various combinations of fuel cells and fuel cell stacks can be referred to generically as fuel cell segments. The positive terminal output of fuel cell or fuel cell stack 602 is connected to the input of DC/DC converter 608 as well as DC/DC converter 612. The negative terminal output of fuel cell or fuel cell stack 604 is connected to DC/DC converter 610, as well as DC/DC converter 614. Node 606 is connected to the inputs of DC/DC converters 608 and 612 and node 607 is connected to the inputs of DC/DC converters 614 and 610. Outputs of DC/DC converters 608 and 614 are electrically connected to +ve bus 620 at node 616. Outputs of DC/DC converters 612 and 610 are electrically connected to –ve bus 622 at node 618. Second outputs of DC/DC converters 608, 612, 614 and 610 are connected to neutral line 624 at node 623. Bus 620 is connected over capacitor 624 to neutral line 632, which itself is connected over capacitor 626 to bus 622.

The electrical connection of the outputs of DC/DC converters 608 and 614 can be accomplished by, for example, providing that both DC/DC converters convert their respective input voltage to the same output voltage (i-ve). Similarly, the connection of the outputs of DC/DC converters 610 and 612 can be accomplished by, for example, providing that both DC/DC converters convert their respective input voltage to the same output voltage (–ve). In other words, the DC/DC converters have different conversion ratios. This is preferably done using isolated DC/DC converters.

Since the power ripple currents generated by DC/DC converters 608 and 614 are approximately 180 degrees out of phase as shown in FIG. 5, a substantial cancellation of these ripple currents can be effected by using the architecture of FIG. 6. A similar cancellation can be effected by connecting the outputs of DC/DC converters 610 and 612.

Figure 7:
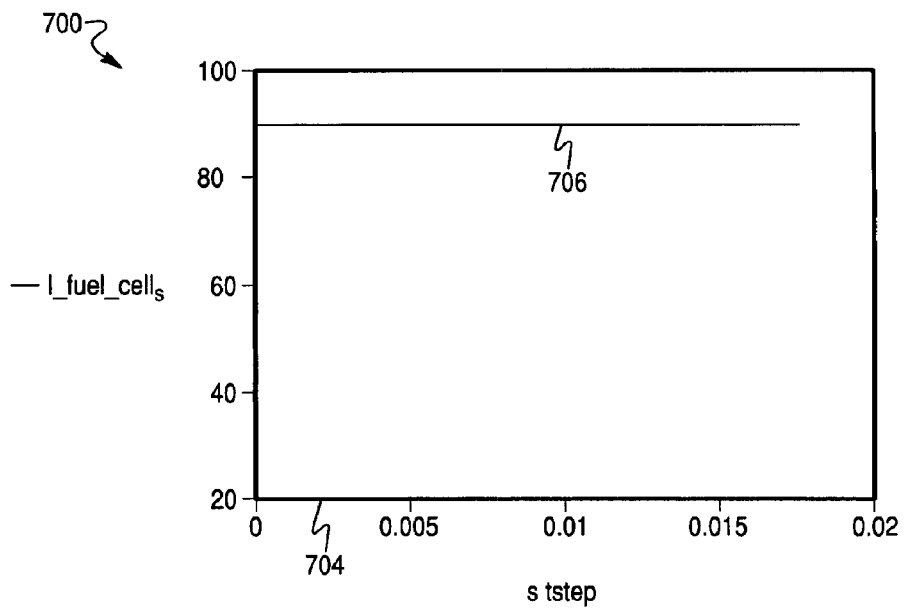
FIG. 7 shows is a simulated graph of instantaneous fuel cell current as a function of time.

FIG. 7 shows the simulated effect on fuel cell current for fuel cells used in the architecture shown in FIG. 6. FIG. 7 is a graph 700 having a Y-axis 702 that represents fuel cell current in dimensionless units, an X-axis 704 representing the passage of time in seconds, and a fuel cell current function 704. It can be seen that the effect of the ripple current, previously shown in FIG. 4 to be almost 30% of the constant component of the current function, is largely eliminated. As shown by the simulated results in FIG. 4, the ripple current cancellation techniques as shown herein can result in a ripple current RMS (root mean squared) amplitude that is less than 5% of the constant average (DC) fuel cell current. As shown in FIG. 7, ripple current cancellation techniques as shown herein can result in a ripple current RMS amplitude that is less than 1% of the constant average (DC) fuel cell current.

Figure 8:
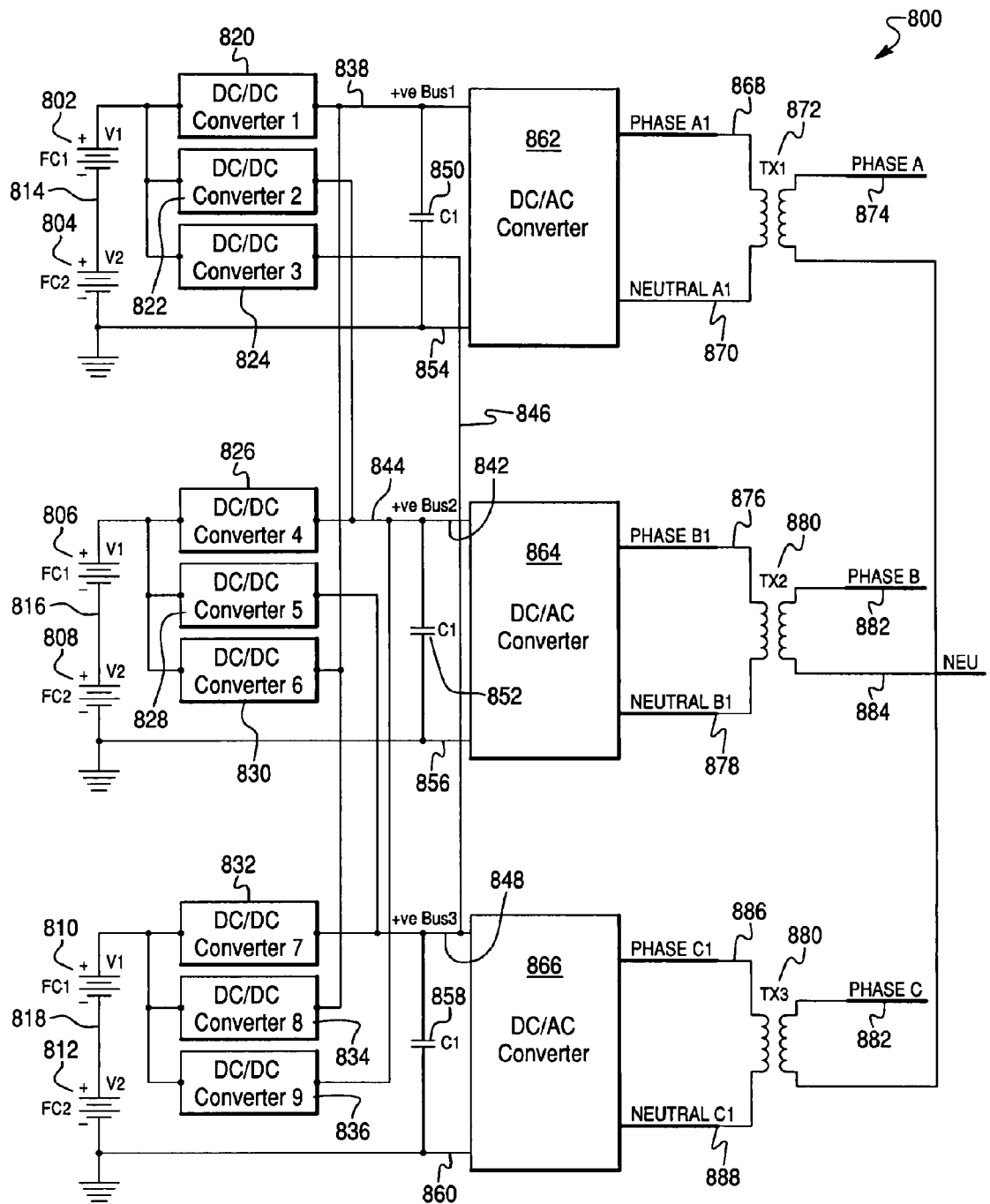
FIG. 8 illustrates a proposed system architecture for part of a fuel cell power conditioning system.

FIG. 8 shows a partial power conditioning system architecture according to another embodiment of the invention. FIG. 8 shows three fuel cell or fuel cell stack pairs 802 and 804, 806 and 808 and 810 and 812. Each of these pairs is connected in series over a respective middle node 814, 816 or 818. The positive output of fuel cell or fuel cell stack 802 is connected to the input of DC/DC converter 820. The middle node 814 is connected to the inputs of DC/DC converters 828 and 830. The positive output of fuel cell or fuel cell stack 806 is connected to the output of DC/DC converter 826, while the middle node 816 is connected to the inputs of DC/DC converters 828 and 830. The positive output of fuel cell or fuel cell stack 810 is connected to the inputs of DC/DC converters 832, 834 and 836.

The +ve bus 838 is connected to the output of DC/DC converters 820, 830 and 834 at node 839. Similarly, the outputs of DC/DC converters 822, 826 and 836 are connected to the +ve bus 842 at node 844, and the outputs of DC/DC converters 824, 828 and 832 are connect to +ve bus 846 at node 848. These connections allow the substantial cancellation of ripple currents generated by these converters.

The +ve busses 838, 842 and 846 are each respectively coupled to a neutral bus 852, 856 or 860 over capacitors 850, 854 and 858, respectively. Each +ve bus 838, 842 and 846 and neutral lines 852, 856 and 860 serve as inputs to DC/AC converters or inverters 862, 864 or 866. These inverters generate three phases on lines 868, 876 and 884, relative to neutral lines 870, 878 and 886 respectively. Transformers 872, 880 and 888 convert the AC phases to appropriate voltage levels for the application in question. The system thus produces the three phase voltage on lines 872, 882 and 888 relative to neutral line 882, while significantly reducing deleterious ripple currents.

The foregoing embodiments of the invention are intended to be illustrative in nature and not limiting. It will be clear to a person of skill in the art that various modifications may be made without parting from the spirit and scope of the present invention, which should be defined only by the following claims.

The invention claimed is:

1. A method for reducing a ripple current in a fuel cell system, comprising:
   supplying a positive output of a fuel cell segment to a first DC/DC converter;
   supplying a negative output of the fuel cell segment to a second DC/DC converter; and
   wherein an output of the first DC/DC converter and an output of the second DC/DC converter are electrically connected; and
   wherein an architecture is configured to operate with a fuel cell current that has a ripple current RMS amplitude of less than 5% of the fuel cell DC current.

2. The method of claim 1, further comprising the steps of:
   supplying the positive output of the fuel cell segment to a third DC/DC converter;
   supplying the negative output of the fuel cell segment to a fourth DC/DC converter; and
   wherein an output of the third DC/DC converter and an output of the fourth DC/DC converter are electrically connected.

3. The method of claim 1, wherein the first and second DC/DC converters comprise isolated DC/DC converters.

4. The method of claim 1, wherein the first and second DC/DC converters have different conversion ratios.

5. The method of claim 1, wherein the architecture is configured to operate with a fuel cell current that has the ripple current RMS amplitude of less than 1% of the fuel cell DC current.

6. The method of claim 2, further comprising the steps of:
   supplying the outputs of the first and second DC/DC converters as a first input to a DC/AC converter; and
   supplying the outputs of the third and fourth DC/DC converters as a second input to the DC/AC converter.

7. The method of claim 6, further comprising the step producing a three-phase current output from the first and second inputs of the DC/AC converter.

8. A method for reducing a ripple current in a fuel cell system, comprising:
   supplying a positive output of a fuel cell segment to a first DC/DC converter;
   supplying a negative output of the fuel cell segment to a second DC/DC converter;
   supplying the positive output of the fuel cell segment to a third DC/DC converter;
   supplying the negative output of the fuel cell segment to a fourth DC/DC converter;
   supplying the outputs of the first and second DC/DC converters as a first input to a DC/AC converter; and
   supplying the outputs of the third and fourth DC/DC converters as a second input to the DC/AC converter;
      wherein an output of the first DC/DC converter and an output of the second DC/DC converter are electrically connected; and
      wherein an output of the third DC/DC converter and an output of the fourth DC/DC converter are electrically connected.

9. The method of claim 8, further comprising the step producing a three-phase current output from the first and second inputs of the DC/AC converter.

* * * * *